United States Patent [19]

Kelber

[11] Patent Number: 4,861,408
[45] Date of Patent: Aug. 29, 1989

[54] MODIFICATION OF POLYMERIC SURFACE FOR IMPROVED ADHESION VIA ELECTRON BEAM EXPOSURE

[75] Inventor: Jeffry A. Kelber, Paradise Hills, N. Mex.

[73] Assignee: The United States of America as represented by the United States Department of Energy, Washington, D.C.

[21] Appl. No.: 36,039

[22] Filed: Apr. 8, 1987

[51] Int. Cl.$^4$ .............................................. B32B 31/28
[52] U.S. Cl. ............................ 156/273.3; 156/307.3; 156/307.7; 156/308.6
[58] Field of Search .................................. 427/39–41; 156/272.6, 285, 272.8, 273.1, 273.3, 273.5, 305, 307.3, 307.7, 308.6; 204/164–165, 192.11, 192.12

[56] References Cited

U.S. PATENT DOCUMENTS

| Re. 28,628 | 11/1975 | Carlson et al. | 204/159.2 |
|---|---|---|---|
| 3,146,146 | 8/1964 | Anderson | 156/272 |
| 3,462,335 | 8/1969 | Hansen et al. | 156/272 |
| 3,738,923 | 6/1973 | Carlson et al. | 204/159.2 |
| 4,072,591 | 2/1978 | Ferse et al. | 204/159.2 |
| 4,140,607 | 2/1979 | Kreiselmeier et al. | 204/168 |
| 4,184,001 | 1/1980 | Hildreth | 428/38.3 |
| 4,220,511 | 9/1980 | Derbyshire . | |
| 4,329,385 | 5/1982 | Banks et al. | 428/141 |

OTHER PUBLICATIONS

Carlson, Photoelectron and Auger Spectroscopy, Plenum Press New York, New York, (1975), p. 264.
Clark & Feast, *Polymer Surfaces*, Wiley & Sons, New York, New York, (1978), pp. 185–211 & pp. 314–318.
Tibbetts, "Electronically Activated Chemisorption of Nitrogen on a Copper (100) Surface3", *Journal of Chemical Physics*, vol. 70, No. 8, (4/15/79), pp. 3600–3603.
Yamakawa & Yamamoto, "Surface Modification of Polyethylene by Radiation Induced Grafting for Adhesive Bonding, IV. Improvement in Wet Peel Strength", *Journal of Applied Polymer Science*, vol. 25 (1980) pp. 25–39.
Knotet & Houston, "Study of the Stepwise Oxidation and Nitridation of Si(111): Electron Stimulated Desorption, Auger Spectroscopy, & Electron Loss Spectroscopy", *Journal of Vacuum Science and Technology B*, vol. 1, No. 4, Oct. Dec. 1983, pp. 899–914.
Collins, Lowe & Nicholas, "An Analysis of PTFE Surfaces Modified by Exposure to Glow Discharges", *European Polymer Journal*, vol. 9 (1973) pp. 1173–1185.

*Primary Examiner*—Merrell C. Cashion, Jr.
*Attorney, Agent, or Firm*—Anne D. Daniel; James H. Chafin; Judson R. Hightower

[57] ABSTRACT

Treating polymer surfaces, e.g., Teflon, particularly very thin surfaces, e.g., 50–10,000 Å with low energy electron radiation, e.g., 100–1000 eV, in a high vacuum environment, e.g., less than $10^{-6}$ Torr, to enhance the ability of the surface to be adhered to a variety of substrates.

18 Claims, No Drawings

MODIFICATION OF POLYMERIC SURFACE FOR IMPROVED ADHESION VIA ELECTRON BEAM EXPOSURE

The U.S. Government has rights in this invention pursuant to Contract No. DE-AC04-76DP00789 between the U.S. Department of Energy and AT&T Technologies, Inc.

BACKGROUND OF THE INVENTION

This invention relates to the modification of a halocarbon, preferably fluorocarbon polymeric surface to provide greater adhesion to a substrate through electron stimulated chemical modification of the near surface region of the polymer, in a high vacuum environment, and more particularly relates to the modification of a polytetrafluoroethylene (PTFE) surface.

DESCRIPTION OF THE PRIOR ART

Processes for the modification of polymeric surfaces to improve the resultant bonding characteristics of the surface are known. Standard techniques to accomplish this typically involved chemically etching the PTFE surface with a sodium-naphthalene complex in an organic solvent, or exposing the PTFE to an RF plasma glow discharge (typically He, Ar, $O_2$ or $NH_3$). In these processes, fluorine atoms are removed from the near surface region and oxygen is substituted therein, thereby providing a more polar and wettable surface for the adhesion. The modification depths involved may be about 1,000 Å or more for the plasma process, and about 1 micron for the chemical etch technique. Consequently, these processes both involve a depth of modification substantially more than the surface atomic layers of the polymer, and thus are undesirable if very thin polymeric films are to be utilized. Additionally, neither of these processes are suitable for modification of parts of a surface unless an accompanying mask is utilized.

U.S. Pat. No. 3,462,335 discloses a process involving the related field of "plasma" processing. In plasma processing, a substrate is exposed to ultraviolet (UV) photon radiation which results from the excitation of the gas. The UV light, which is capable of chemically altering most polymers, may penetrate very substantial distances into the material, and the resultant plasma processing modification depths may be as high as several micrometers (Clark et al, *Polymer Surfaces*, Ed. by D. T. Clark and W. J. Feast, Wiley & Sons, New York, N.Y. (1978), p. 199). Such large modification depths are undesirable in many thin film applications and frequently have a detrimental effect on adhesive bond strength, as set forth by Yamakawa and Yamamoto, *J. of Applied Polymer Science*, 25, pp. 41–49 (1980). Moreover, the plasma process set forth in U.S. Pat. No. 3,462,335 will modify the entire polymeric surface unless a mask is utilized.

U.S. Pat. No. 3,146,146 prescribes the use of high energy (1 million - 1 billion eV) electrons for polymer radiation in order to provide laminates with metal sheets. The patent teaches that the polymer must be melted prior to irradiation in the disclosed process.

U.S. Pat. No. 4,140,607 discloses the modifying of polymer material for improving adhesion by exposure of the material to a low pressure gas discharge (plasma) and to electrons generated by the interaction of the plasma with the electrode surfaces.

A publication, *Polymer Surfaces*, edited by D. T. Clark et al, John Wiley & Sons, New York, N.Y., pp. 314–318, discusses the mean free path of electrons as a function of the kinetic energy and the particular polymeric material.

The article in *European Polymer Journal* (1973), Vol. 9, pp. 1173–1185, by G. L. S. Collins et al, "An Analysis of PTFE Surfaces Modified by Exposure to Glow Discharges", analyzes the chemical and physical modifications which occur in PTFE surfaces which are exposed to glow discharges in ammonia gas and in air.

OBJECTS OF THE INVENTION

Accordingly, it is an object of this invention to provide a process for modifying a halocarbon polymeric surface, such as PTFE, to enhance adhesion of the polymeric surface to a conventional elastomeric adhesive, e.g., an epoxy or a metallic substrate via a conventional adhesive, in an economic and effective manner.

Another object of this invention is to provide a process for chemically modifying the surface of a thin halocarbon polymer film.

It is another object of this invention to provide a halocarbon polymeric surface which has been modified by bombardment with low energy electrons in allow pressure gas environment.

Upon further study of the specification and appended claims, further objects and advantages of this invention will become apparent to those skilled in the art.

SUMMARY OF THE INVENTION

These and other objects have been attained by the process of the invention wherein the adhesion properties of a halocarbon polymer surface are improved by exposing the polymer surface to an electron bombardment from an electron beam of low energy electrons in a controlled atmosphere, under high or ultra high vacuum pressures, e.g., pressures not higher than about $10^{-6}$ Torr, and for a time sufficient to chemically modify the polymer surface. Optionally, the halocarbon polymer surface may be pretreated with a solvent.

The invention further comprises a polymeric article having improved wettability and an improved ability to adhere to metallic substrates by conventional adhesives; said polymer surface having been subjected to a low energy electron beam for a time sufficient to chemically modify only the immediate polymer surface, said electron beam occurring under pressures of not higher than about $10^{-6}$ Torr, in a controlled gas atmosphere.

DETAILED DISCUSSION

Suitable polymers and/or copolymers may be employed in the process of this invention can be selected from halocarbon, preferably fluorocarbon, polymers. Typical polymers and copolymers suitable for usage in the practice of the invention are polytetrafluoroethylene, polymonochlorotrifluoroethylene, polyvinylidene fluoride, polyvinyl fluoride, polyvinylidene chloride, polyvinyl chloride and copolymers of vinylidene fluoride and hexafluoropropylene. The preferred polymer is polytetrafluoroethylene.

Although the process of the invention can be used to modify the surface of relatively thick polymer layers, the process is especially useful in treating thin polymer films having a thickness of about 50 Å–10,000 Å, and in particular about 50–100 Å. Such thin polymer films find application in the manufacture of electrical components and as corrosion inhibiting coatings.

Substrates suitable for bonding to the treated polymer surface via a conventional adhesive include a wide variety of metallic coatings, particularly, aluminum, brass, copper or steel surfaces are exemplary substrates. It is preferred to treat the polymer surface to be exposed to irradiation with an organic solution of acetone and/or a solution of methanol prior to the experiment for the purpose of removing surface debris. This pretreatment step is optional and the polymer surface can be modified by the irradiation process without initial solvent cleaning. Although acetone and/or methanol solutions are preferred, a wide variety of other solvents known to those in the art may be also utilized for such pretreatment.

The depth of chemical modification of the polymer surface can be influenced by variations in the energy of the electron beam. At the energies described, the estimated electron mean free path is about 10 Å (T. A. Karlson, *Photoelectron and Auger Spectroscopy*, Plenum Press, New York, N.Y. (1975), p. 264). An estimate of this chemical modification depth according to the invention is about 100 Å, or approximately 10 mean free path lengths, or several orders of magnitude smaller than the depths generally achieved in plasma processing. However, by manipulation of the process variables, e.g., current density, exposure time, electron energy, etc., smaller chemical modification depths, for example about 30 Å, can be achieved.

Although in the broadest embodiment of the invention, a wide variety of methods producing low energy electron bombardments may be utilized to treat a polymer surface, it is preferred to expose the polymer surface to an electron beam, i.e., a focused, controlled stream of low energy electrons. An electron beam can be relatively easily controlled, whereas plasmas, which contain photons, ions and excited neutral atoms, cannot be confined or controlled by the electrostatic methods useful in electron beam control. Through the utilization of a beam, instead of a randomized bombardment, the electron stream can be very accurately focused upon a particular point of the polymer surface, and, e.g., transported across the surface to trace a desired pattern without the use of a mask. Thus, the specific region of the polymer surface being modified can be controlled by electrostatically focussing and aiming the electron beam. Alternatively, the polymer surface can be treated with an unfocused beam of electrons, but such a procedure would require a mask if modification is to be limited to only specific portions of the surface.

It is preferred to utilize only low energy electrons for irradiation of the polymer surface, that is electrons having energies of less than about 1000 eV, preferably about 100-1000 eV, and in particular about 200 to 350 eV. The process of the invention is carried out under high or ultra high vacuum conditions, that is, under pressures of about $10^{-6}$ Torr or less. Suitable apparatus for producing such pressure, as well as for conducting the aforementioned process of irradiation of the polymer, are well known to those of ordinary skill in the art.

Although applicants do not wish to be bound by theory, it is believed that during the process of the invention low energy electrons strike the polymer surface to be irradiated and result in the breaking of, e.g., carbon-fluorine bonds in the case of PTFE. Upon breaking of the surface chemical bonds, the halogen atoms are desorbed from the polymer. The resultant chemical structure of the polymer surface is not clearly known but it is believed that carbon radicals, formed after the carbon-halogen bonds are broken, react together to form carbon-carbon bonds. In addition, trace components present in the ultra high vacuum environment, e.g., $O_2$ or $NH_3$, may react with the polymer surface and thereby be incorporated into the surface through substitution of the desorbed halogen atoms.

Modification of the polymer surface extends only to a depth of about 4-100 Å, preferably about 30 Å. Thus, through the practice of the invention, the chemical modification depth of the substrate surface will be several orders of magnitude smaller than the modification achieved in plasma processing systems. Consequently, in addition to involving both precise control of the depth and location of the irradiation, the process is particularly suitable for very thin polymer films having a thickness of about 50-10,000 Å.

Typical current densities to which the polymer surface is exposed during the process range from about $10^{-5}$ to $10^{-8}$ A/cm$^2$. A wide variety of exposure times can be so utilized, typically about 30 to 60 minutes Exposure time will vary inversely with current density.

The surface modification process is preferably conducted at around room temperature, although higher temperatures can be employed. The process is normally performed at temperatures below the decomposition temperature or melting temperature of the polymer.

One skilled in the art will readily understand that the focus of the invention resides in the discovery that the aforementioned polymers may be bonded with conventional adhesives without undergoing a preliminary surface treatment with the corresponding degradation of electrical properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following example, all temperatures are set forth uncorrected in degrees Celsius and all parts and percentages are by weight unless otherwise indicated.

EXAMPLE 1

A polytetrafluoroethylene sample was first rinsed with methanol and then subjected to a beam of low energy electrons at a pressure lower than $9 \times 10^{-8}$ Torr. The voltage of the electron beam was about 230 eV. Exposure time was about 30-60 minutes. The treated samples were then subjected to tensile pull tests.

The tensile pull tests involved bonding the treated samples to aluminum plugs with an adhesive and then testing the strength of the bonds. The results of the pull tests indicated an average polymer-adhesive joint strength of 330 psi. Control polymer samples which were rinsed with methanol but not subjected to electron beam exposure exhibited a polymer-adhesive joint strength of approximately 0 psi.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for improving the adhesion properties of a halocarbon polymer surface, wherein the polymer surface is exposed to an electron bombardment in a controlled atmosphere, the improvement wherein the polymer surface is exposed to an electron beam of low energy electrons having an energy level of not more than about 1000 eV, under vacuum pressures not higher than about $10^{-6}$ Torr, for a time sufficient to chemically modify the polymer surface to improve the adhesion properties of said surface.

2. A process according to claim 1, wherein the halocarbon polymer is polyvinyl fluoride, polyvinyl chloride, polyvinylidene fluoride, polyvinylidene chloride, polytetrafluoroethylene, polymonochlorotrifluoroethylene or a copolymer of vinylidene fluoride and hexafluoropropylene.

3. A process according to claim 1, wherein the halocarbon polymer is polytetrafluoroethylene.

4. A process according to claim 1, wherein the halocarbon polymer surface is pretreated with a solvent.

5. A process according to claim 1, wherein the electron beam comprises electrons having an energy level of about 100–1000 eV.

6. A process according to claim 1, wherein the electron beam comprises electrons having an energy level of about 200–350 eV.

7. A process according to claim 1, wherein the substrate is modified to depths of about 4–100 Å.

8. A process according to claim 1, wherein the substrate is modified to depths of about 30 Å.

9. A process according to claim 1, wherein the halocarbon polymer surface is exposed to current densities which range from about $10^{-5}$ to $10^{-8}$ A/cm$^2$.

10. A process according to claim 1, wherein the halocarbon polymer is in the form of a film having a thickness of about 50 Å or greater.

11. A process according to claim 1, wherein electron bombardment is performed at about room temperature.

12. A process according to claim 1, wherein electron bombardment is performed at a temperature below the decomposition temperature of the halocarbon polymer.

13. A process according to claim 1, further comprising applying an adhesive to the modified halocarbon polymer surface and adhering the polymer to a substrate.

14. A process according to claim 13, wherein the substrate is a metallic substrate.

15. A process according to claim 14, wherein the metallic substrate is aluminum, brass, copper or steel.

16. A process for preparing a lamination of a halocarbon polymer surface, an adhesive, and a substrate, said process comprising:
chemically modifying a polymer surface to a depth of about 4–100 Å by exposing the polymer surface to an electron beam of low energy electrons having an energy level of not more than about 1000 eV, under vacuum pressures not higher than about $10^{-6}$ Torr, thereby improving the ability of the polymer surface to adhere to an elastomeric adhesive;
applying an adhesive to the modified polymer surface; and
adhering the halocarbon polymer to a substrate.

17. A process according to claim 10, wherein the halocarbon polymer film has a thickness of about 50–10,000 Å.

18. A process according to claim 10, wherein the halocarbon polymer film has a thickness of about 50–100 Å.

* * * * *